(12) United States Patent
Franke et al.

(10) Patent No.: US 6,590,156 B2
(45) Date of Patent: Jul. 8, 2003

(54) SENSOR AND PROFILE GROOVE HOUSING

(75) Inventors: Arnd Franke, Petershagen (DE); Torsten Hässler, Minden (DE)

(73) Assignee: Bernstein AG, Porta Westfalica (DE)

( * ) Notice: Subject to any disclaimer, the term of this patent is extended or adjusted under 35 U.S.C. 154(b) by 0 days.

(21) Appl. No.: 10/151,249

(22) Filed: May 21, 2002

(65) Prior Publication Data

US 2002/0174996 A1 Nov. 28, 2002

(30) Foreign Application Priority Data

May 23, 2001 (DE) .................................. 201 08 649 U

(51) Int. Cl.[7] ................................................ H02G 3/08
(52) U.S. Cl. ....................... 174/50; 174/135; 174/48; 174/58; 220/3.2
(58) Field of Search .............................. 174/50, 54, 58, 174/61, 63, 65 R, 135, 52.3, 48; 220/3.2, 3.5, 3.7, 4.02; 73/866.5, 724, 727, 756

(56) References Cited

U.S. PATENT DOCUMENTS

| | | | | |
|---|---|---|---|---|
| 4,879,903 A | * | 11/1989 | Ramsey et al. ................ 73/431 |
| 5,039,853 A | * | 8/1991 | Blake et al. ................. 250/239 |
| 5,126,510 A | * | 6/1992 | Bauer et al. .................... 174/50 |
| 5,381,089 A | * | 1/1995 | Dickmeyer et al. .......... 174/52.3 |
| 5,414,355 A | * | 5/1995 | Davidson et al. ............ 123/617 |
| 5,430,249 A | * | 7/1995 | Phelps et al. .................. 174/50 |
| 5,638,944 A | * | 6/1997 | Diebel et al. ................ 439/488 |
| 5,704,813 A | * | 1/1998 | Weeks et al. ............. 439/540.1 |
| 5,829,880 A | * | 11/1998 | Diedrich ....................... 285/93 |
| 6,006,610 A | * | 12/1999 | Lehnert ........................ 73/760 |
| 6,015,533 A | * | 1/2000 | Young et al. ................. 204/428 |
| 6,111,249 A | * | 8/2000 | Garner, III ................... 250/216 |
| 6,112,592 A | * | 9/2000 | Kathan ......................... 73/431 |
| 6,203,366 B1 | * | 3/2001 | Muller et al. ................ 439/561 |
| 6,301,982 B1 | * | 10/2001 | Kubo et al. ................... 74/5.22 |
| 6,423,197 B1 | * | 7/2002 | Lenferink et al. ........... 204/408 |
| 6,490,939 B1 | * | 12/2002 | Sargent ...................... 73/866.5 |

* cited by examiner

Primary Examiner—Dean A. Reichard
Assistant Examiner—Angel R. Estrada
(74) Attorney, Agent, or Firm—Barnes & Thornburg

(57) ABSTRACT

A sensor having a sensor housing made of a housing tube which has a receiving space axially penetrating the housing tube, preferably for an electronic sensor system. The housing tube is a hollow cylinder which has axially extending flats on two mutually opposite areas. A profile groove housing for the sensor includes an insertion area with parallel walls and a receiving area adjoining the insertion section. The receiving area is essentially circular in cross-section.

7 Claims, 1 Drawing Sheet

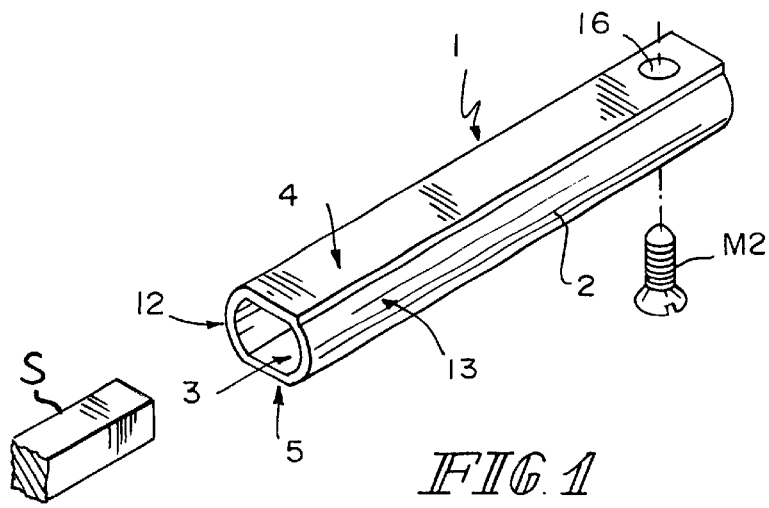
FIG. 1
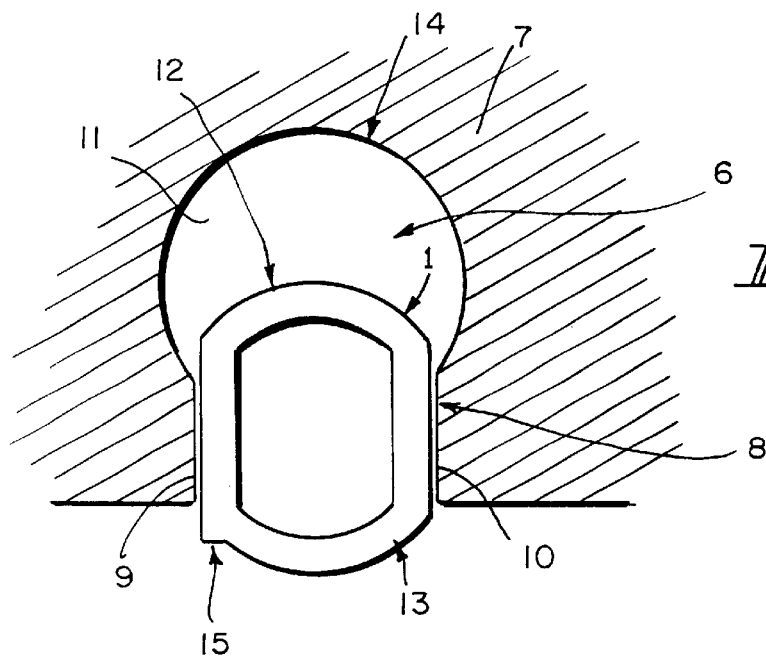
FIG. 2
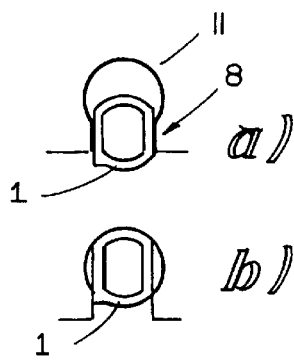
a)
b)
FIG. 3
c)
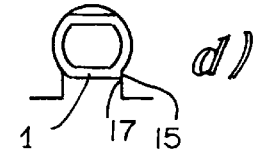
d)

SENSOR AND PROFILE GROOVE HOUSING

BACKGROUND AND SUMMARY OF THE INVENTION

The present invention relates to a sensor and, more specifically, to a sensor housing and a profile groove housing for the unique sensor housing.

Sensors and profile groove housings are known in many different constructions. There is need for improvement with respect to the mounting of the sensor in the profile groove housing, which mounting is often relatively awkward and difficult.

It is an object of the innovation to provide a sensor housing and a profile groove housing such that the sensor can be mounted and demounted in a simple manner.

The invention meets this objective.

The sensor has a sensor housing made of a housing tube which has a receiving space axially penetrating the housing tube. The housing tube is constructed as a hollow cylinder which has flats extending axially on two mutually opposite areas.

The sensor is designed for being accommodated in a profile groove of a profile groove housing. The profile groove has an insertion section with two mutually parallel walls and a receiving area for the sensor which adjoins the insertion section. The receiving area essentially has a circular cross-section.

As a result of the advantageous interaction between the sensor and the profile groove housing, mounting and demounting the sensor is easy and uncomplicated.

Advantageous further developments are disclosed.

These and other aspects of the present invention will become apparent from the following detailed description of the invention, when considered in conjunction with accompanying drawings.

BRIEF DESCRIPTION OF THE DRAWINGS

FIG. 1 is a perspective view of a sensor housing according to the present invention.

FIG. 2 is a representation of the insertion of the sensor housing into a profile groove.

FIGS. 3a to d are views of stages of the insertion of the sensor housing into the profile groove in four successive steps.

DETAILED DESCRIPTION OF THE PREFERRED EMBODIMENTS

FIG. 1 illustrates a sensor housing 1 having a housing tube 2 which has a receiving space 3 axially penetrating the housing tube 2. The housing is for an electronic sensor system S, for example. The housing tube 2 is a hollow cylinder which has flats 4, 5 extending axially on two mutually opposite areas and separated by round side walls 12 and 13. A stop ledge 15 is provided at the juncture of flat 4 and side wall 13.

As illustrated in FIGS. 2 and 3, the sensor with the sensor housing 1 can be pushed into a profile groove 6 of a profile groove housing 7 of an apparatus which is otherwise not shown.

The profile groove 6 has an insertion section 8 with two mutually parallel walls 9, 10 and a receiving area 11 for the sensor adjoining the insertion section 8. The receiving area 11 has a circular cross-section.

As shown in FIG. 3, it is therefore possible to first align the sensor housing 1 such that the flats 4, 5 extend parallel to the walls 9, 10, and to slide it through the insertion section 8 into the receiving space 11 (FIG. 3b). The mutual spacing of the walls 9, 10 is designed such that, in this alignment, the sensor housing 1 can just barely be guided through the insertion section 8.

In the receiving area 11, the sensor housing 1 can then be rotated by 90° about its axial longitudinal axis (FIG. 3c) until it is situated in its end position in which the flats 4, 5 are situated perpendicular to their insertion position. Thus, rounded side walls 12, 13 of the sensor housing 1 engage the also circular (cylindrical) interior wall 14 of the receiving space 11 (FIG. 3d).

In this position, the stop 15 extending axially in the area of one of the corners of the sensor housing comes to rest on a corresponding stop area 17 of wall 9 in the receiving area 11, so that its position is clearly defined. In this end position, the sensor housing 1 is fixed by a threaded pin or screw (such as M2) through opening 16 in the housing 1. The opening 16 may also be threaded. In this installed position, the active side of the sensor points to a magnet (not shown). Because of its geometry, the sensor housing 1 can no longer fall out of the profile groove 7. The removal takes place in the reverse order. The electronic system of the sensor preferably comprises a device for analyzing the detecting of magnets (not shown) situated in the profile groove housing.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A sensor comprising:
   a sensor housing made of a housing tube which has a receiving space axially penetrating the housing tube;
   the housing tube being a hollow cylinder which has axially extending flats on two mutually opposite areas separated by rounded side walls;
   an axially extending stop ledge at a juncture of one of the flats and the rounded side wall of the housing tube; and
   a sensor system in the receiving space.

2. The sensor according to claim 1, wherein the sensor housing has a threaded bore for receiving a screw.

3. A profile groove housing for a sensor having a cylindrical sensor housing with opposed axial flats, the profile groove housing including a profile groove comprising:
   an insertion section with two mutually parallel walls; and
   a receiving area adjoining the insertion section, the receiving area having essentially a circular cross-section designed such that the sensor housing can be rotated in the receiving area, rounded side walls of the sensor housing resting against an interior wall of the receiving area.

4. The profile groove housing according to claim 3, wherein the spacing of the walls is adapted to the spacing of the flats on the housing such that the sensor housing can be guided just barely through the insertion section.

5. The profile groove housing according to claim 3, wherein the sensor housing has a stop ledge for a contact on a corresponding stop in the receiving area.

6. A profile groove housing for a sensor having a cylindrical sensor housing with opposed axial flats, the profile groove housing including a profile groove comprising:

an insertion section with two mutually parallel walls; and a receiving area adjoining the insertion section, the receiving area having essentially a circular cross-section;

wherein the sensor housing has a stop ledge for a contact on a corresponding stop in the receiving area.

7. The profile groove housing according to claim 6, wherein the receiving area is designed such that the sensor housing can be rotated in the receiving area, rounded side walls of the sensor housing resting against an interior wall of the receiving area.

* * * * *